US010013634B2

(12) United States Patent
Sharma et al.

(10) Patent No.: US 10,013,634 B2
(45) Date of Patent: Jul. 3, 2018

(54) MULTI-SENSOR VISUAL ANALYTICS

(71) Applicant: Tata Consultancy Services Limited, Mumbai (IN)

(72) Inventors: Geetika Sharma, Gurgaon (IN); Gautam Shroff, Gurgaon (IN); Puneet Agarwal, Noida (IN); Aditeya Pandey, Gurgaon (IN); Gunjan Sehgal, Gurgaon (IN); Kaushal Ashokbhai Paneri, Gurgaon (IN); Brijendra Singh, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 47 days.

(21) Appl. No.: 15/350,962

(22) Filed: Nov. 14, 2016

(65) Prior Publication Data

US 2017/0140244 A1    May 18, 2017

(30) Foreign Application Priority Data

Nov. 13, 2015 (IN) .......................... 4316/MUM/2015

(51) Int. Cl.
*G06K 9/62* (2006.01)
*G06N 99/00* (2010.01)
(Continued)

(52) U.S. Cl.
CPC ..... *G06K 9/6212* (2013.01); *G06F 17/30572* (2013.01); *G06K 9/6221* (2013.01);
(Continued)

(58) Field of Classification Search
CPC .. G06K 9/6212; G06K 9/6265; G06K 9/6221; G06F 17/30572; G06T 11/206; G06N 99/005
See application file for complete search history.

(56) References Cited

U.S. PATENT DOCUMENTS 8,212,817 B2    7/2012    Hao et al.
2014/0184604 A1    7/2014    Bak et al.

OTHER PUBLICATIONS

Wartiainen, "Detector-Based Visual Analysis of Time-Series Data", Academic dissertation, Jyväskylä Studies in Computing, University of Jyväskylä, 83 pages, (2015).

(Continued)

*Primary Examiner* — Maurice L. McDowell, Jr.
(74) *Attorney, Agent, or Firm* — Finnegan, Henderson, Farabow, Garrett & Dunner LLP

(57) ABSTRACT

This disclosure relates generally to multi-sensor visual analytics, and more particularly to method and system for multi-sensor visual analytics using machine-learning models. In one embodiment, a method for multi-sensor visual analytics includes acquiring sensor data associated with a plurality of sensors for a plurality of days of operation. A plurality of multi-dimensional histograms, having operational profiles of the plurality of sensors are computed from the sensor data. The plurality of multi-dimensional histograms are monitored, and a plurality of multi-sensor patterns are obtained from the plurality of multi-dimensional histograms. The plurality of multi-sensor patterns are indicative of one or more properties of a plurality of sensor-clusters of the plurality of sensors. One or more visual analytical tasks are performed by processing the plurality of multi-sensor patterns using at least one machine-learning model. The one or more visual models are rendered based on the processing of the multi-sensor patterns.

19 Claims, 9 Drawing Sheets

(51) Int. Cl.
G06T 11/20 (2006.01)
G06F 17/30 (2006.01)

(52) U.S. Cl.
CPC ......... *G06K 9/6265* (2013.01); *G06N 99/005* (2013.01); *G06T 11/206* (2013.01)

(56) References Cited

OTHER PUBLICATIONS

Keim et al., "Visual Analytics: Definition, Process and Challenges", Visualization—Human-Centered Issues and Perspectives, HAL archives-ouvertes, Springer, 1 cover sheet and pp. 155-175, (2008) http://link.springer.com/chapter/10.1007/978-3-540-70956-5_7.
Kimani et al., "Visualization of Multidimensional Sensor Data in Industrial Engineering", 2013 17th International Conference on Information Visualisation, Conference Publishing Services. IEEE pp. 156-161, (2013).

MULTI-SENSOR VISUAL ANALYTICS

PRIORITY CLAIM

This U.S. patent application claims priority under 35 U.S.C. § 119 to: India Application No. 4316/MUM/2015, filed on Nov. 13, 2015. The entire contents of the aforementioned application are incorporated herein by reference.

TECHNICAL FIELD

This disclosure relates generally to multi-sensor visual analytics, and, more particularly, to a method and system for multi-sensor visual analytics supported by machine-learning models.

BACKGROUND

Multi-sensor visual analytics includes visualization of large scale multi-dimensional sensor data. Complex machines such as aircraft, vehicles and engines are fitted with numerous sensors that produce large volumes of data for each second of operation. Said large volumes of data generated by the sensors are to be analyzed by experts, for instance engineers. In certain instances, a machine designed for a particular application may also be used in other scenarios or applications. For instance, an engine may be used in a crane, pump or wood chipper.

It may be prudent to understand the behavior of machines in different applications, to test design hypotheses against actual practice and support future design decisions. As a result, a large number of basic visualizations such as histograms and long multivariate time-series arising from data derived from numerous sensors embodied in multiple machines across many years may be generated, and analyzed. However, analysis of said data by performing visual analytic tasks on such large volumes of data may be challenging.

Traditionally, the data derived from the sensors is analyzed by using various techniques including dimensionality reduction, scale reduction, or data reduction methods first and then using data visualization techniques on such data-summaries.

SUMMARY

Embodiments of the present disclosure present technological improvements as solutions to one or more of the above-mentioned technical problems recognized by the inventors in conventional systems. For example, in one embodiment, a processor implemented method for multi-sensor visual analytics is provided, where the method includes acquiring sensor data associated with a plurality of sensors for a plurality of days of operation, via one or more hardware processors. Further, the method includes computing a plurality of multi-dimensional histograms associated with the plurality of sensors from the sensor data, via the one or more hardware processors. The plurality of multi-dimensional histograms comprises one of two dimensional and three dimensional histograms. The plurality of multi-dimensional histograms includes operational profiles of the plurality of sensors. Furthermore, the method includes monitoring the plurality of multi-dimensional histograms and obtaining a plurality of multi-sensor patterns from the plurality of multi-dimensional histograms, via the one or more hardware processors. The plurality of multi-sensor patterns are indicative of one or more properties of a plurality of sensor-clusters of the plurality of sensors. Moreover, the method includes performing one or more visual analytical tasks by processing the plurality of multi-sensor patterns using at least one machine-learning model, via the one or more hardware processors. Also, the method includes rendering one or more visual models based on the processing of the multi-sensor patterns, via the one or more hardware processors.

In another embodiment, a system for multi-sensor visual analytics is provided. The system includes one or more memories; and one or more hardware processors, the one or more memories coupled to the one or more hardware processors wherein the one or more hardware processors are capable of executing programmed instructions stored in the one or more memories to acquire sensor data associated with a plurality of sensors for a plurality of days of operation. The one or more hardware processors are capable of executing programmed instructions to compute a plurality of multi-dimensional histograms associated with the plurality of sensors from the sensor data. The plurality of multi-dimensional histograms comprises one of two dimensional and three dimensional histograms. The plurality of multi-dimensional histograms includes operational profiles of the plurality of sensors. Further, the one or more hardware processors are capable of executing programmed instructions to monitor the plurality of multi-dimensional histograms and obtain a plurality of multi-sensor patterns from the plurality of multi-dimensional histograms. The plurality of multi-sensor patterns are indicative of one or more properties of a plurality of sensor-clusters of the plurality of sensors. Furthermore, the one or more hardware processors are capable of executing programmed instructions to perform one or more visual analytical tasks by processing the plurality of multi-sensor patterns using at least one machine-learning model. In addition, the one or more hardware processors are capable of executing programmed instructions to render one or more visual models based on the processing of the multi-sensor patterns.

In yet another embodiment, a non-transitory computer-readable medium having embodied thereon a computer program for executing a method for multi-sensor visual analytics is provided. The method includes acquiring sensor data associated with a plurality of sensors for a plurality of days of operation. Further, the method includes computing a plurality of multi-dimensional histograms associated with the plurality of sensors from the sensor data. The plurality of multi-dimensional histograms comprises one of two dimensional and three dimensional histograms. The plurality of multi-dimensional histograms includes operational profiles of the plurality of sensors. Furthermore, the method includes monitoring the plurality of multi-dimensional histograms and obtaining a plurality of multi-sensor patterns from the plurality of multi-dimensional histograms. The plurality of multi-sensor patterns are indicative of one or more properties of a plurality of sensor-clusters of the plurality of sensors. Moreover, the method includes performing one or more visual analytical tasks by processing the plurality of multi-sensor patterns using at least one machine-learning model. Also, the method includes rendering one or more visual models based on the processing of the multi-sensor patterns.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary

DETAILED DESCRIPTION

Figure 1:
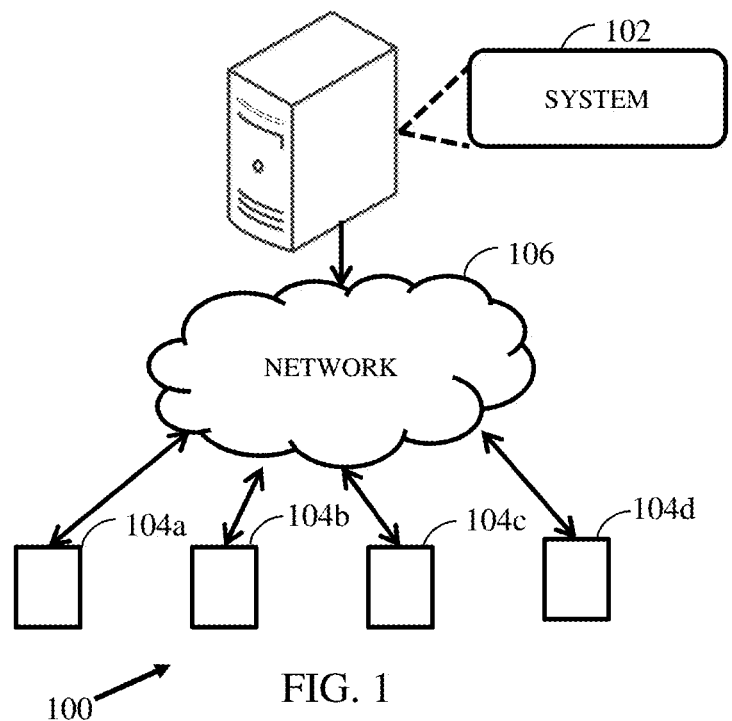
FIG. 1 illustrates a network implementation of a system for multi-sensor visual analytics, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

System and method for multi-sensor visual analytics are disclosed in present subject. The multi-sensor data may be received from industrial machines, such as production equipment. The multi-sensor data may be analysed to determine actual usage patterns to which the products or industrial machines are subjected to in the field. Understanding of the actual equipment usage patterns is important for developing and improving operational maintenance plans (for example, in the case of operators), and can even prove valuable for high value insurers, e.g. of costly assets such as aircraft or nuclear plants.

Typically, various analytical tasks may be performed on the sensor data for multitude of purposes. For instance, such analytical tasks may provide useful information regarding (a) operational profiles of sensors, (b) days of operation exhibiting similar behavioural profiles, (c) how dependent sensors affect each other, and (d) identifying occurrences of events, characterized by specific patterns in sensor readings, such as an engine being laden, a vehicle performing a hard-stop or passing maneuver, and examine behaviour during such events. However, when confronted with overwhelming number of basic visualizations such as histograms and long multivariate time-series arising from data of dozens or sensors from multiple machines across many years, it may become difficult to navigate the sheer volume of data to perform said visual analytics tasks.

Traditionally, the sensor data may be summarized via dimensionality reduction, scale reduction, or data reduction methods first and then using data visualization techniques on such data-summaries to analyse the data. For example, a summary view of histograms is presented via hierarchical histograms. However, such an approach completely misses the similarity of histograms of specific sensors across multiple days of operations. Similarly, when analysing time-series, a traditional approach is to find frequently occurring patterns in the time-series and present the patterns to the users. However such an approach lacks the capability to search for ad-hoc multidimensional patterns. Techniques of data-summarization such as semantic zooming of time-series may be ineffective because they fall short when the need is to identify occurrences of multi-sensor behavioural patterns in large time-series. For example, conventionally, in order to determine operational profiles of sensors and identify days of operation exhibiting similar behavioural profiles at the operational profiles of various sensors of a machine for one day of operation and try to associate each profile a stereotype behaviour about which they develop an understanding with their experience of analysis. As the experts learn these stereotype operational profiles of various sensors with their experience of analysing the histograms, the manual process of visual analytics is not only error prone but also ineffective. This may be attributed to the fact that a) the analyst may know about the stereotype operational profiles of specific sensors only b) Since the knowledge about stereotype patterns is based on the experience of users, new users find it hard to analyse the operational-profiles, and c) even the experienced users may miss a few subtle patterns.

Also, in order to understand how dependent sensors affect each other, analysts intend to study the distribution of sensor values under a condition. For example, study of fuel-consumption pattern when engine is laden. However, with current state-of-the-art it is hard to execute such queries, primarily because of volume of time-series data encountered in practice. Finally, to identify occurrences of events, characterized by specific patterns in sensor reading, multivariate time-series visualization of voluminous sensor-data is often used for examining scenarios arising due to occurrence of events such as failure of a part/component of the machine. In the process, the multiple time-series may need to be searched for specific patterns. However, with current state of art searching the multiple time-series is time-consuming and computationally complex.

The disclosed embodiments over the shortcomings mentioned above by building machine learning models that are used to interlink basic visualizations, to provide a summary view, and to make visualizations query-able and searchable, thereby enabling navigation of large volumes of multi-sensor data and perform the visual analytics tasks (a)-(d) mentioned above.

Various embodiments disclosed herein provide methods and systems for multi-sensor visual analytics to visually represent analysis of multi-sensor data using various machine-learning tools, where the multi-sensor data is derived as a result of processing of sensor data obtained from a plurality of sensors over long time periods. For instance, the disclosed methods and the systems may facilitate in analysing the operational profiles of sensors by exploring the distributions of each sensor's values on days of operation and identifying days of operation exhibiting similar behavioural profiles by using a clustering model such as spherical clustering model, Balanced Iterative Reducing and Clustering using Hierarchies (BIRCH) clustering to group similar histograms together, as well as a multi-subspace clustering technique to summarize common multi-sensor patterns of operational-profiles. Both models serve as aids in navigating large collections of histograms as well as in identifying outliers for further investigate. Additionally, the disclosed embodiments enables in understanding of how dependent sensors affect each other by using a Bayesian data fusion technique to enable efficient probabilistic queries on large volumes of time-series. Moreover, the disclosed embodiments facilitates in identification of occurrences of events, characterized by specific patterns in sensor readings, such as an engine being laden, a vehicle performing a hard-stop or passing maneuver, and examine behaviour during such events.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The methods and systems are not limited to the specific embodiments described herein. In addition, the method and system can be practiced independently and separately from other modules and methods described herein. Each device element/module and method can be used in combination with other elements/modules and other methods.

The manner, in which the system and method for multi-sensor visual analytics shall be implemented, has been explained in details with respect to the FIGS. 1 through 7. While aspects of described methods and systems for multi-sensor visual analytics can be implemented in any number of different systems, utility environments, and/or configurations, the embodiments are described in the context of the following exemplary system(s).

Referring now to FIG. 1, a network implementation 100 of system 102 for multi-sensor visual analytics is illustrated, in accordance with an embodiment of the present subject matter. In various embodiments, the system 102 facilitates common platform for multi-sensor visual analytics supported by machine learning models. The system 102 augment basic data visualizations such as multi-dimensional histograms, heat-maps and basic time-series visualizations with machine-learning models that aid in summarizing, querying, searching, and interactively linking visualizations derived from large volumes of multi-sensor data. Herein, it will be noted that although the present subject matter is explained considering that the system 102 is implemented for multi-sensor visual analytics, it may be understood that the system 102 may is not restricted to any particular machine or environment. The system 102 can be utilized for a variety of domains as well as for sensor-data where high-dimensional data (such as multi-sensor data) is involved. The system 102 may be implemented in a variety of computing systems, such as a laptop computer, a desktop computer, a notebook, a workstation, a mainframe computer, a server, a network server, and the like.

Herein, the system 102 may receive the sensor data from multiple devices one or more devices and/or machines 104-1, 104-2 . . . 104-N, collectively referred to as sensor devices 104 hereinafter. Examples of the sensor devices 104 may include, but are not limited to, industrial machines, a portable computer, a personal digital assistant, a handheld device, a workstation, sensor embodying devices, as storage devices equipped in the machines to store the sensor readings, and so on. The sensor devices 104 are communicatively coupled to the system 102 through a network 106. The terms 'sensor devices' and 'sensors' may refer to the devices that may provide sensor data to the system 102, and thus the terms 'sensor device' and 'sensor' may be used interchangeably throughout the description. In an embodiment, the sensor devices 104 may include heavy duty industrial machines which contain readings/data from various sensors (engine speed, fuel consumption, and the like) observed on regular intervals of time.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

The sensor devices 104 may send sensor data to the system 102 via the network 106. The system 102 is caused to analyze the sensor data to summarize machine usage. Herein, the sensor data that is received from multiple sensors for the specified time-period may be referred to as 'multi-sensor data'. A sensor's behavior over a period of operation can be represented by a histogram that can capture the distribution of different values of that sensor data for a specified time-period over which the machine runs. The time period can be a single run of the machine, a day, a week, and so on.

In an embodiment, the system 102 may be embodied in a computing device 110. Examples of the computing device 110 may include, but are not limited to, a desktop personal computer (PC), a notebook, a laptop, a portable computer, a smart phone, a tablet, and the like.

In an embodiment, the system 102 is caused to compute multiple multi-dimensional histogram (or intensity profiles) from the sensor data. The system 102 is caused to compute multi-dimensional histograms representative of each of the sensors' behavior for each day, and systematically summarize the multi-sensor data to determine machine behavior. Herein, it will be noted that the term 'multi-dimensional histograms' refers to two dimensional and three dimensional histograms. For the brevity of description, henceforth, the multi-dimensional histograms may be referred to as 'histograms'. Additionally, the system is caused to derive a plurality of multi-sensor time-series patterns from the sensor data.

In another embodiment, the system 102 may receive the summarized sensor data from an external server communicatively coupled to the system 102. The system 102 may process the summarized sensor data (or multi-sensor data) to augment visualizations of the processed multi-sensor data for aiding in summarizing, querying, searching, and interactively linking visualizations derived from large volumes of multi-sensor data. An example implementation of the system 102 for multi-sensor visual analytics is described further with reference to FIG. 2.

Figure 2:
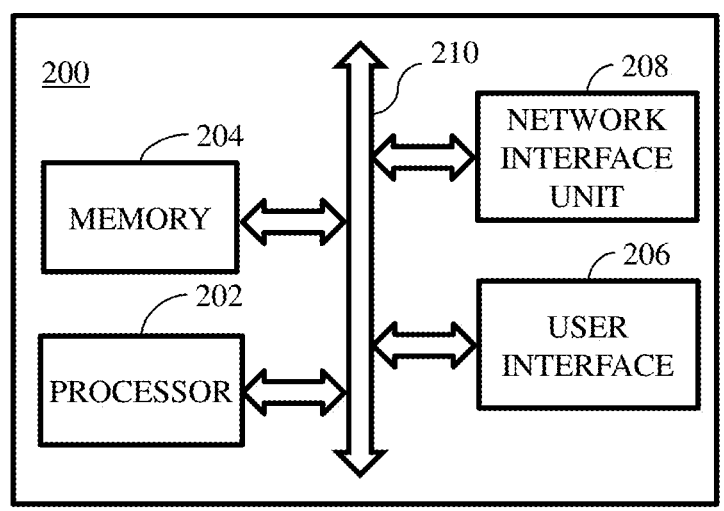
FIG. 2 illustrates a block diagram of a system for multi-sensor visual analytics, according to some embodiments of the present disclosure.

FIG. 2 illustrates a block diagram of a system 200 for multi-sensor visual analytics, in accordance with an embodiment of the present disclosure. The system 200 includes or is otherwise in communication with one or more hardware processors such as a processor 202, one or more memories such as a memory 204, a user interface such as a user interface 206, and a network interface unit such as a network interface unit 208. In an embodiment, the processor 202, the memory 204, the user interface 206, and the network interface unit 208 may be coupled by a system bus such as a system bus 210 or a similar mechanism.

The processor 202 may include circuitry implementing, among others, audio and logic functions associated with the communication. For example, the processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 202 thus may also include the functionality to encode messages and/or data or information. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The one or more memories memory such as the memory 204, may store any number of pieces of information, and data, used by the system to implement the functions of the system. The memory 204 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the system 200 to carry out various functions in accordance with various example embodiments. Additionally or alternatively, the memory 204 may be configured to store instructions which when executed by the processor 202 causes the system to behave in a manner as described in various embodiments.

A user interface (UI) 206 may be in communication with the processor 202. The UI 206 may include an input interface and/or an output user interface. The input interface may receive a user input. The output user interface may render an output or feedback which can be directed to a user. Various example of modes of providing the output may include, but are not limited to, audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the memory 204, and/or the like, accessible to the processor 202.

The network interface unit 208 is configured to facilitate communication between the sensors (or the devices incorporating the sensors) and the system 200. The network interface unit 206 may be in form of a wireless connection or a wired connection. Examples of wireless network interface element 208 may include, but are not limited to, IEEE 802.11 (Wifi), BLUETOOTH®, or a wide-area wireless connection. Example of wired network interface element 208 includes, but is not limited to Ethernet.

The system 200 is caused to acquire, via the network interface unit 208, a sensor data associated with a plurality of sensors collected over a time period. In an embodiment, the system 200 is caused to partition the sensor data into a plurality of portions such that each of the plurality of portions includes the sensor data for a day's operation of the machine. The system 200 is further caused to compute a plurality of histograms from each of the portions for the plurality of sensors, thereby generating a set of histograms. In an embodiment, the system 200 is caused to compute the histograms for all sensors for every day of operation.

In an embodiment, the system 200 is caused to compute a plurality of histograms from the sensor data such that each histogram of the plurality of histograms is representative of sensor behavior over a time period (for example, each day of the plurality of days). The histograms are computed with a fixed set of bins for every sensor.

The system 200 is caused to group/cluster the histograms of each of the plurality of sensors into a first plurality of sensor-clusters, such that each sensor-cluster includes histograms of similar shape. Each sensor-cluster of the first plurality of sensor-clusters includes a cluster of histograms corresponding to a sensor for one or more days. In an embodiment, the system 200 is caused to cluster the set of similar histograms in a sensor-cluster such that a distance measure between the histograms of the set of similar histograms is less than a threshold distance measure. So, two histograms of a sensor for different days of operation may be termed as similar if the distance measure between the histograms is less than a first threshold value of the distance measure. Herein, the distance between the histograms is representative of shape similarity between the histograms. In an embodiment, the distance between the histograms may be an Euclidean distance, an Earth mover distance, Kullback-Leibler divergence, Bhattacharyya distance, Manhattan distance, Wasserstein metric (also known as the Kantorovich metric), and so on.

In an embodiment, a clustering model such as spherical clustering model, Balanced Iterative Reducing and Clustering using Hierarchies (BIRCH), may be utilized for clustering the histograms into sensor-clusters. The BIRCH clustering model takes an initial value of distance measure threshold as a parameter. In an embodiment, the system 200 is caused to utilize the value of radius of spherical sensor-clusters as the first threshold value of the distance measure. The first threshold value of distance measure may depend on the quality and number of clusters associated with a sensor. In an embodiment, a DB-Index may be utilized as a statistical measure of quality of sensor-clusters. The system 200 is caused to perform the BIRCH clustering for various values of the threshold and select that value of radius for which the value of DB-index is optimum. The DB-index is a metric for evaluating clustering models, where the validation of how well the clustering has been done is made using quantities and features inherent to a dataset. In an embodiment, the value of the threshold value may be selected to be as low as possible for optimum value of DB-index while also ensuring that the centroid of a sensor-cluster represents the histograms in that cluster. Clustering the sensors individually generates a set of sensor-clusters.

The system 200 is caused to monitor the plurality of histograms and obtain a plurality of multi-sensor patterns from the plurality of histograms. The plurality of multi-sensor patterns are indicative of one or more properties of a plurality of sensor-clusters of the plurality of sensors. In an embodiment, the system 200 is caused to represent the days by the set of sensor-clusters of the different sensor in which the sensor histograms lie. In other words, the system 200 may be caused to cluster the days based on multiple different subspaces. Herein, first individual sensor histograms are clustered using BIRCH model as described above, and then the patterns of a sensor are collaboratively merged based on the co-occurrence with a pattern in other sensors. For this, every patterns is modeled as nodes of a graph, and connected with an edge if the two patterns are of different sensor and they often co-occur on the same days, or if the two patterns are of same sensor and the Euclidean distance between them is small. The system may a run community detection algorithm on the graph to perform the subspace clustering, and thereby identify multiple subspaces as well as the clusters. In an embodiment, the patterns identified from sub-space clustering may be utilized for interlinking the histograms and heat-maps.

The system 200 may be caused to perform one or more visual analytical tasks by processing the plurality of multi-sensor patterns using at least one machine-learning model. In various embodiments, the plurality of visual analytical tasks includes (a) obtaining operational profiles of the plurality of sensors based on a clustering of the multi-sensor patterns to summarize common multi-sensor patterns of operational-profiles (b) identifying a set of days of operation from amongst the plurality of days of operation for the plurality of sensors associated with matching histograms (c) determining how dependent sensors affect each other, and (d) identifying occurrences of events, characterized by specific patterns in sensor readings.

In an embodiment, the system 200 may be caused to obtain operational profiles of the plurality of sensors based on a clustering of the multi-sensor patterns and BIRCH clustering to group similar histograms together, so as to summarize common multi-sensor patterns of operational-profiles. Both models may serve as aids in navigating large collections of histograms as well as in identifying outliers for further investigate. In the present embodiment, the system 200 may further be caused to render one or more visual models on a UI, for example, the UI 206 based on the processing of the multi-sensor patterns. An example of render one or more visual models on the UI 206 based on the processing of the multi-sensor patterns in accordance with the present embodiment is described in detail with reference to FIGS. 3A and 3B.

In another embodiment, the system 200 may be caused to identify a set of days of operation from amongst the plurality of days of operation for the plurality of sensors associated with matching histograms. The system 200 may utilize clustering of the multi-sensor patterns and BIRCH clustering to group similar histograms together, so as to summarize common multi-sensor patterns of operational-profiles. In the present embodiment, the system 200 may further be caused to render one or more visual models on a UI, for example, the UI 206 based on the processing of the multi-sensor patterns. An example of rendering one or more visual models on the UI 206 based on the processing of the multi-sensor patterns in accordance with the present embodiment is described in detail with reference to FIG. 4.

In yet another embodiment, the system 200 may be caused to explore correlations across sensors by enabling execution of conditional distribution queries. In an embodiment, the system 200 may be caused to render a visual model having a single linked view containing distributions of a correlated set of sensors. The linked view may contain 1D or 2D distributions of sensors visualized as histograms or heat-maps. The UI 206 may enable users to select specific range of values of specific sensors, and press a query button to see the resultant conditional distribution of remaining sensors. Herein, executing such queries directly requires at least a single pass through all the data, and accordingly the system utilizes a Bayesian network to summarize the data for more efficient, albeit probabilistic, query execution. In the present embodiment, the system 200 may further be caused to render one or more visual models on a UI, for example, the UI 206 based on the processing of the multi-sensor patterns. An example of rendering one or more visual models on the UI 206 based on the processing of the multi-sensor patterns in accordance with the present embodiment is described in detail with reference to FIG. 5A-5C.

In still another embodiment, the system 200 may be caused to identify occurrences of events, characterized by specific patterns in sensor readings. In an embodiment, the system 200 may be caused to enable searching or querying the multi-sensor waveform patterns with one or more queries or conditions. In order to detect a particular condition, a temporal pattern may be formulated using domain knowledge. For example, when an engine is laden, the torque being delivered increases but its speed decreases (unlike while, say, accelerating to cruising speed). So, the laden engine condition can be detected by determining those intervals of time in which torque increases but speed decreases. In an embodiment, the system may be caused to pre-process the time-series data to make it searchable via queries specified as patterns of increasing, decreasing or flat slopes with bounds on the duration of occurrence. A pattern recognition algorithm known in the art is utilized to combine a slope-based logical run-length encoding, clustering of symbolic patterns in this space, and a trie-based index structure for efficiently retrieving instances of multi-sensor logical patterns. In the present embodiment, the system 200 may further be caused to render one or more visual models on a UI, for example, the UI 206 based on the processing of the multi-sensor patterns to enable execution of conditional distribution queries. An example of rendering one or more visual models on the UI 206 based on the processing of the multi-sensor patterns in accordance with the present embodiment is described in detail with reference to FIG. 6.

Figure 3A:
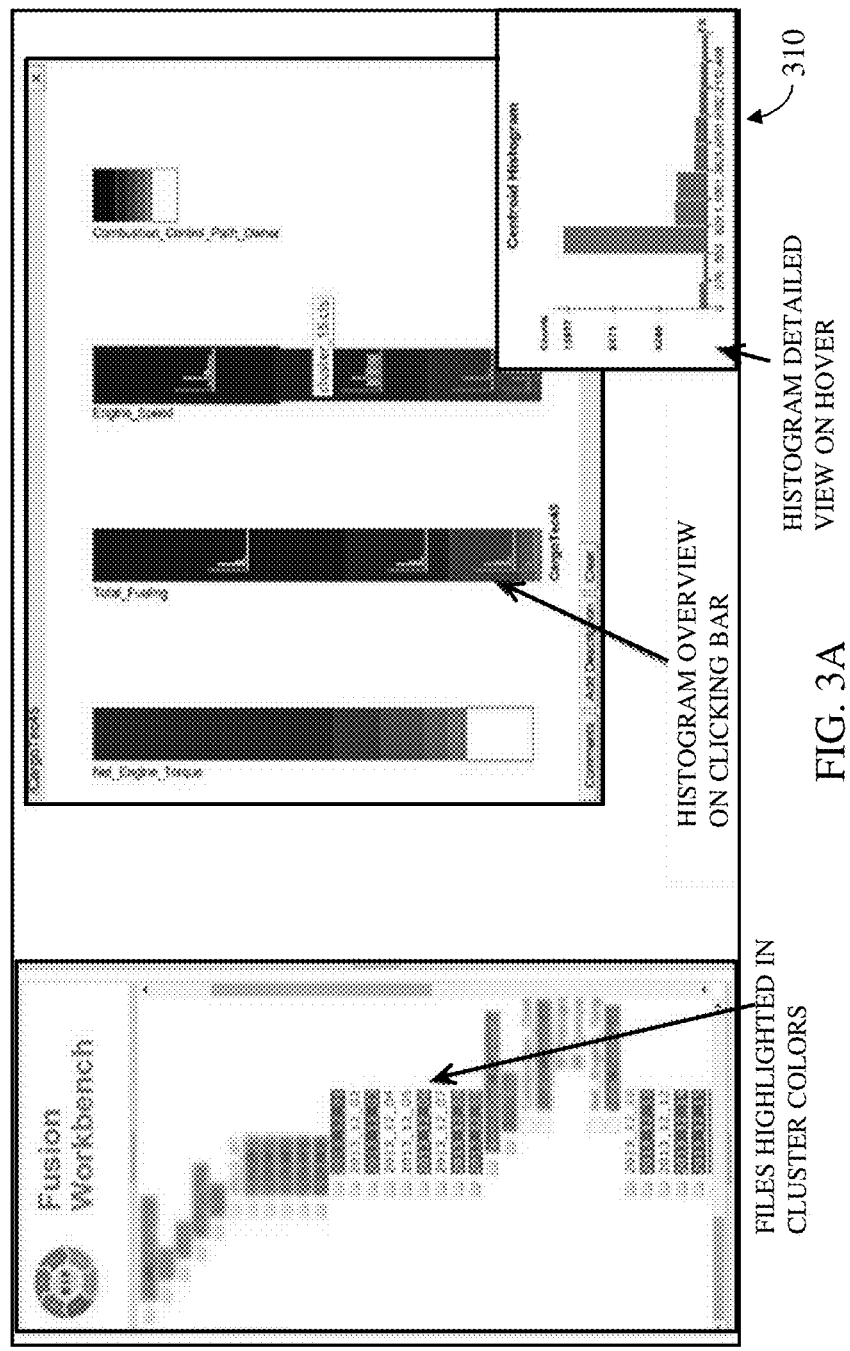
FIGS. 3A and 3B illustrate an example representation of a visual analytics technique to study the operational profiles of sensors, according to some embodiments of the present disclosure.
Figure 3B:
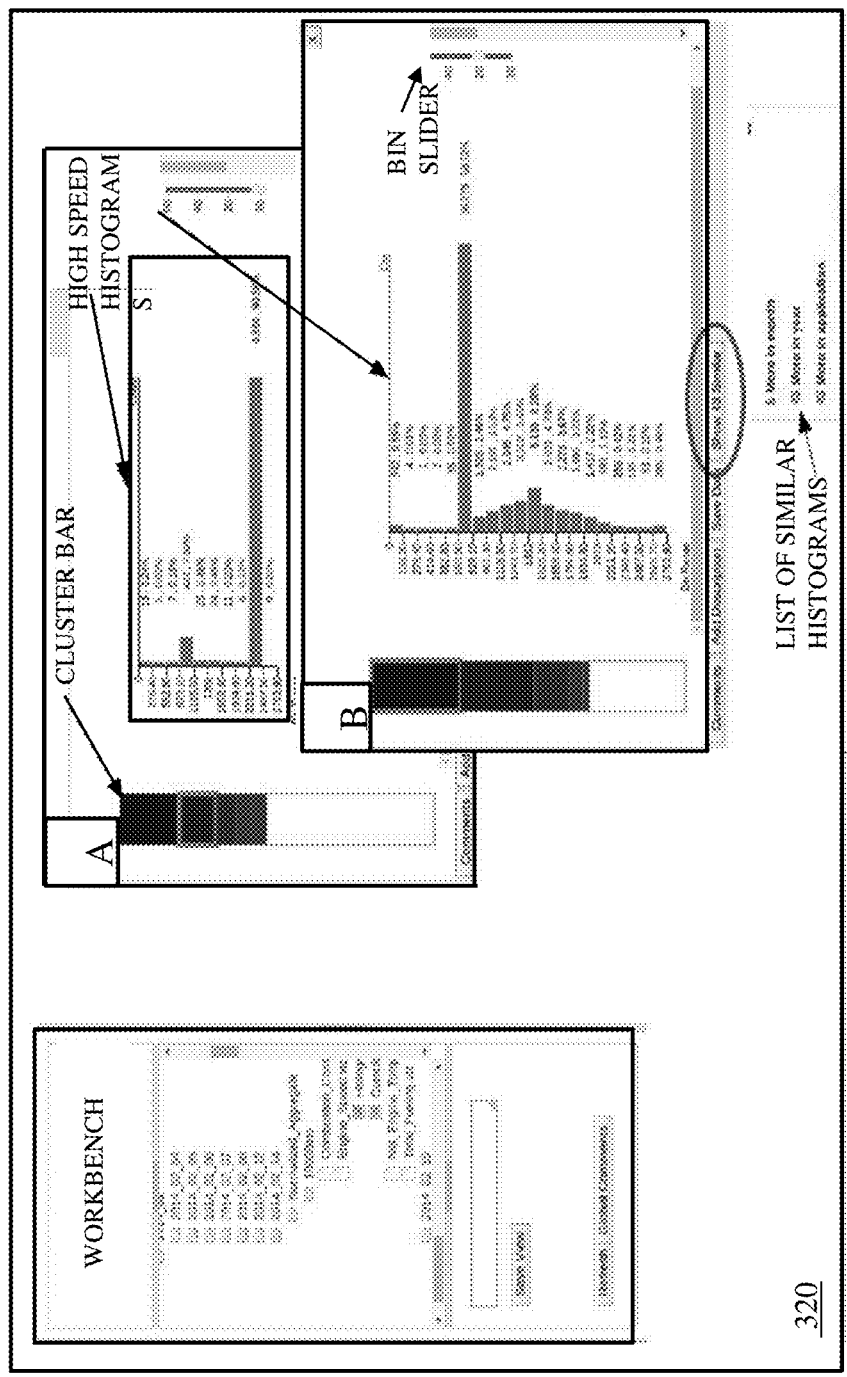

FIGS. 3A and 3B illustrate an example representation 310 and 320, respectively of a visual analytics technique to study the operational profiles of sensors, in accordance with an example embodiment. The example representations 310 and 320 illustrate the operational profiles of engines in various applications. The operational profiles of the engine in various applications may have to be understood, by for example, users. In the present embodiment, users may include engineers and analysts. An engine's operational profile is defined in terms of the behavior of important engine components such as speed and torque. The operational profile (histogram) of a sensor for a day of operation of a machine illustrates the nature of operation and the users associate this to one of the stereotype operational-profiles. In order to understand the operational profiles of a large volume of sensors and machines, the disclosed system may automatically group the similar histograms of many sensors together and then present it to the users.

In the present embodiment the distribution of observed values for each day as well as aggregates for each month and year for each sensor is computed by the system. One dimensional distributions are computed as histograms with 1000 bins over a range of operation, while 2-dimentional (2-D) distributions are computed with a 100 bins on each dimension. Multiple sensors are analyzed at the same time, and for multiple months of operations, leading to thousands of such distributions which require to be analyzed. The users may perform various operations such as, zoom-in and zoom out every distribution, view summary of various distinct patterns in distribution of individual sensors, navigate the interlinked distributions via summary patterns, semantically search the patterns, and view groups of days that are similar based on the distributions of multiple sensors.

Stereotype patterns for each sensor may be found by utilizing machine-learning model. Every 1-D distribution (histogram) is represented as a vector with 1000 rows, and 2-D distributions (heat-map) is represented as a vector with 10,000 rows. The distributions are clustered using BIRCH clustering, designed in a way to cluster large multi-dimensional datasets. Further, Euclidean distance may be utilized as the distance measure for clustering. Cluster radius for each sensor may be selected by optimizing a DB-Index (database index), for different values of radius on a sample data first. Since data is from physical machines, the distributions are not affected by dimensionality, to obtain distinct patterns/clusters.

The days of operations of a machine or a set of machines having similar operations may be grouped. The patterns are identified such that cumulatively the groups cover as many days as possible. Multi-subspace clustering technique, i.e., clustering the days based on multiple different subspaces and community detection algorithm are utilized to identify patterns for interlinking the histograms and heat maps as described below.

In the present embodiment illustrated with reference to FIG. 3A, the user-interface may be divided into three parts, a thin panel on the left-hand side displays the data folder as a file tree on top, and smaller a panel at the bottom left with a couple of buttons and a text box for providing input. The larger right hand panel is reserved for displaying visualizations which are accessed by navigating to a desired file in the file tree and clicking it. This causes the corresponding visualization to open on the right hand side panel in a window. For example, operational profiles, i.e., day-wise histograms, are each associated with a file. These files are systematically organized in a hierarchical manner, with all files for a particular application or type of machine (e.g. 'crane') grouped into a high-level folder. A similar organization may be replicated for raw time-series files.

In the present embodiment, the visual display model may render a user interface with a single text box for all textual input to the system. The input may be file names or search strings. Search results may be displayed by highlighting files in the file tree with colors that are part of a relevant visual encoding. Appropriate buttons may be present on the side panel and visualization windows, to be used during the visualization process.

In the present embodiment two ways of navigating day-wise histograms is provided. BIRCH clustering is utilized to navigate the histogram data, as shown in FIGS. 3A and 3B. FIG. 3A displays a rectangular bar summarizing the clusters for a sensor alongside each of its histograms with the appropriate cluster highlighted. Thus, a user looking at a particular histogram also sees which cluster that histogram lies in as well as the summary of clusters found for that sensor. In order to see other histograms in the same cluster, a button is provided with the label 'Show x Similar', x being the number of histograms similar to the current one. On clicking this button, users see a list with the number of histograms similar in the same month or year, as well as the total number of histograms in the same cluster. The user may click on one of these, for example, similar in the same year and the corresponding days get highlighted in the file tree view.

Further, a view with all the sensor cluster summaries for a particular application is provided. This view can be opened by (a) selecting the cluster summary file for an application in the file tree or (b) clicking the rectangular bar alongside a histogram, as above. The view contains one rectangular bar for each sensor summarizing its clusters. On clicking the bar, the centroid histograms for each cluster within its sub-rectangle can be displayed, thereby presenting the distributions for all clusters. Hovering the mouse over a sub-rectangle provides a more detailed view of the histogram for that cluster.

Since clustering may return a large number of clusters of small size, in one embodiment 4-5 large clusters for each sensor may be selected and the others are grouped in a miscellaneous cluster. A color is assigned to each sensor, and the clusters of a given sensor may be represented in a rectangular bar as sub-rectangles of varying shades of the same color. The miscellaneous cluster is not filled with any color. The lengths of the sub-rectangles are proportional to cluster sizes.

Further, by double-clicking a particular cluster sub-rectangle all the files in the file tree which lie in that cluster are highlighted with the cluster's color, as well as the selected cluster in the visualization. A user may double-click sub-rectangles of up to four clusters to identify days in which sensor 1 was in cluster X, sensor 2 was in cluster Y and so on. Such files are highlighted in the file tree with the color of chosen cluster by splitting the length of the file name in equal parts. Thus day-files with the chosen sensor profiles are easily identifiable.

Similarly, groups of similar operation-days may also be formulated for understanding 'common patterns' characterized by similar behavior across more than one sensor. Multi-subspace clustering technique is utilized to discover a small set of rules, expressed in terms of cluster membership, that cover a large fraction of histograms. Multi-sensor patterns representing different types of machines in a completely unsupervised manner are identified utilizing the multi-subspace clustering technique. For visual analytics, multi-subspace clustering is performed within each machine type, to characterize its common behavior patterns.

FIG. 3B consists of two windows A and B, to depict histograms of engine speed for the same engine under different applications. In A the engine operates primarily at one high speed and in B it operates over a spread of lower speeds. The bin slider 3, may be used to see finer bin granularity. Further, in the FIG. 3B cluster bar 2, displays the bar of clusters summarizing engine speed behavior for the individual applications. The cluster in which the histogram lies is highlighted with a grey rectangle. Other histograms in the same cluster may be viewed by clicking on the 'show similar' button 4 and selecting from the options of similar histograms in the same month, year or application.

Clicking on the cluster bar 2, causes the A to open. In FIG. 3A, the cluster summary for multiple sensors for an application is shown. Clicking on a bar 1, shows the centroid histograms for each cluster as small icons. By hovering the mouse over a cluster rectangle, the histograms in a detailed mode in a separate div is displayed. The position of the div does not change so that moving mouse over different cluster rectangles updates the histograms and changes between them can be easily seen. Finally, double clicking a cluster rectangle causes all files in that cluster to be highlighted in the file tree 3, with the cluster color.

Figure 4:
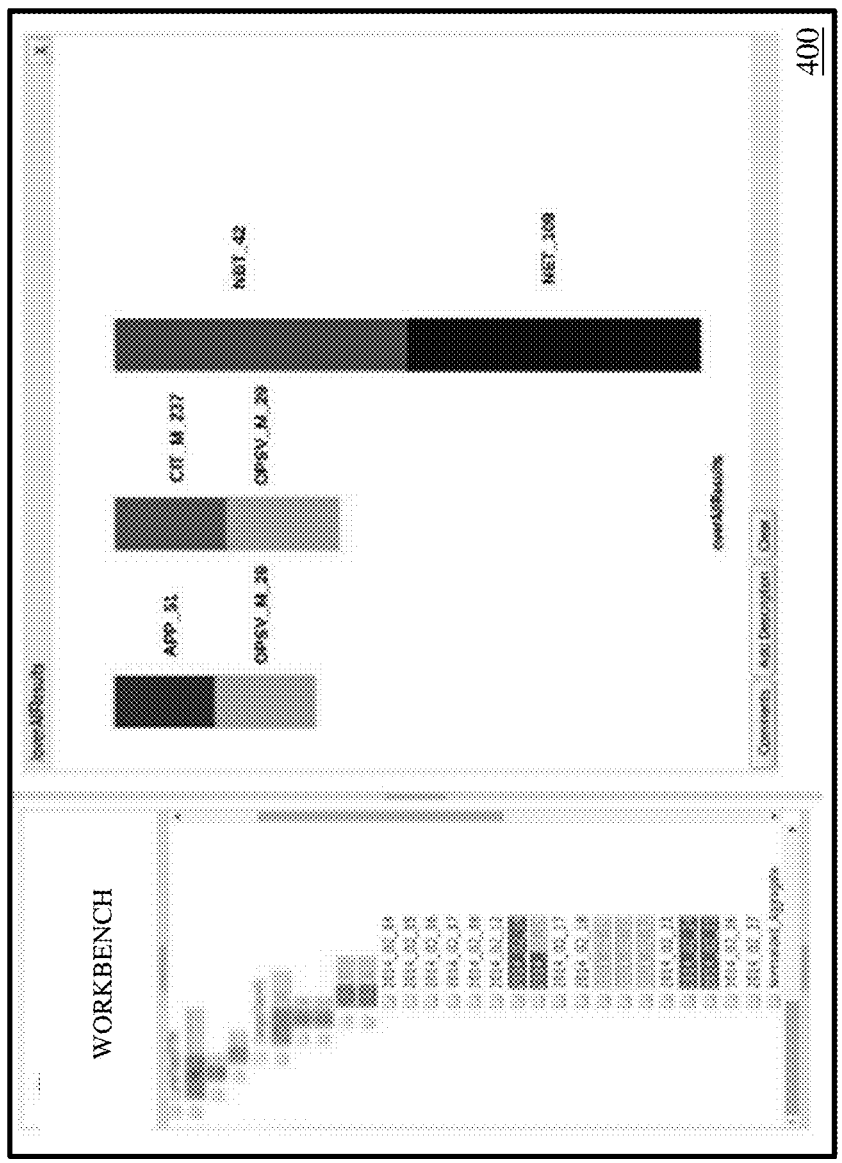
FIG. 4 illustrates an example representation of a visual analytics technique for multi-sensor pattern summary, according to some embodiments of the present disclosure.

FIG. 4 illustrates an example embodiment for a visual analytics technique for multi-sensor pattern summary, in accordance with an example embodiment. FIG. 4 illustrates the patterns identified using multi-subspace clustering. In the FIG. 4 every vertical bar indicates a group of days, every section of the bar indicates a pattern of a sensor, length of the pattern is proportional to the number of days following the pattern. Every section may pertain to different sensor. Similar to FIGS. 3A and 3B, the days corresponding to a pattern get highlighted in the left hand tree on clicking it.

In FIG. 4, three multi-sensor patterns discovered using multi-subspace clustering with similar interaction mechanism as the cluster summary view are illustrated. A user may use a bottom-up approach and start with a sensor histogram for a particular day, look at other days in its cluster or go to the cluster summary view for all sensors as illustrated in FIGS. 3A and 3B. Alternately, the user may start with the cluster summary view or multi-sensor pattern summary view as illustrated in FIG. 4 to get a sense of overall behavior and drill down to interesting days of operation for multiple sensors using the multi-color file highlighting.

Figure 5A:
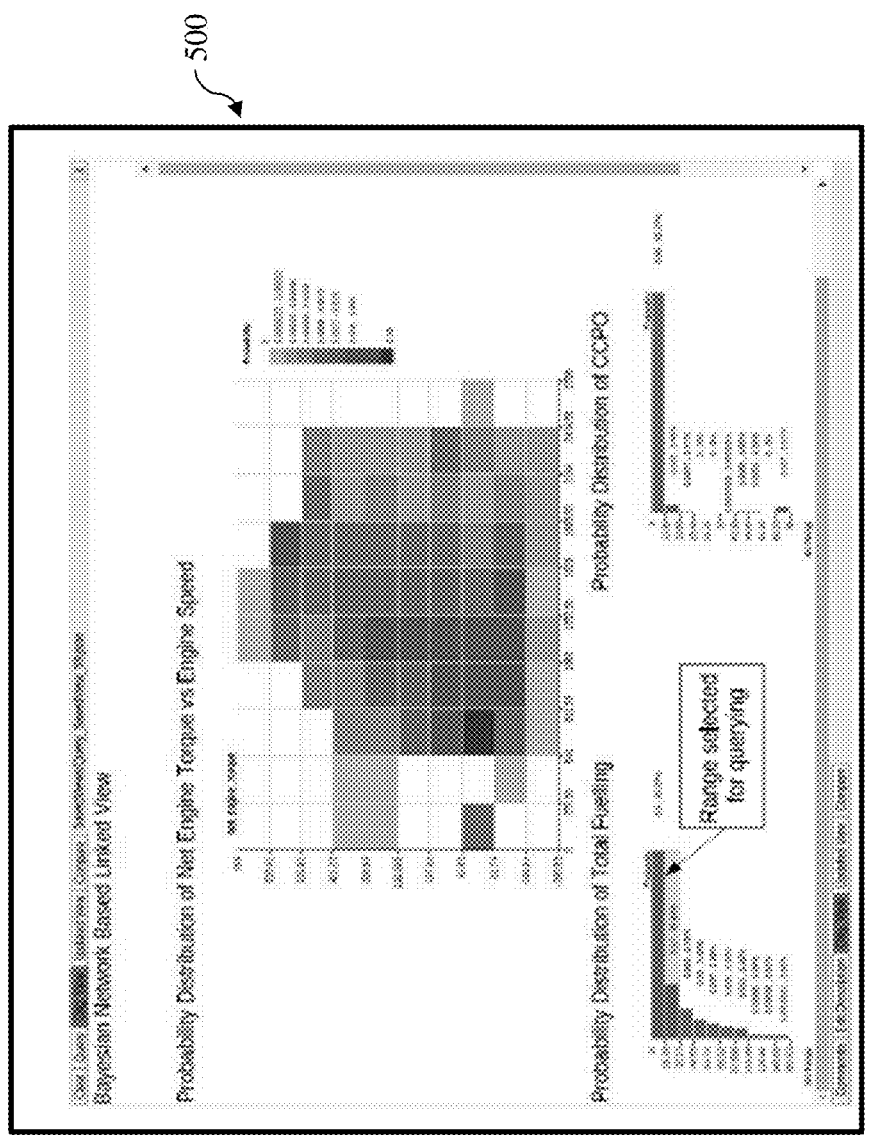
FIGS. 5A, 5B and 5C illustrate an example embodiment of a visual analytics technique for exploring correlations across sensors, according to some embodiments of the present disclosure.
Figure 5B:
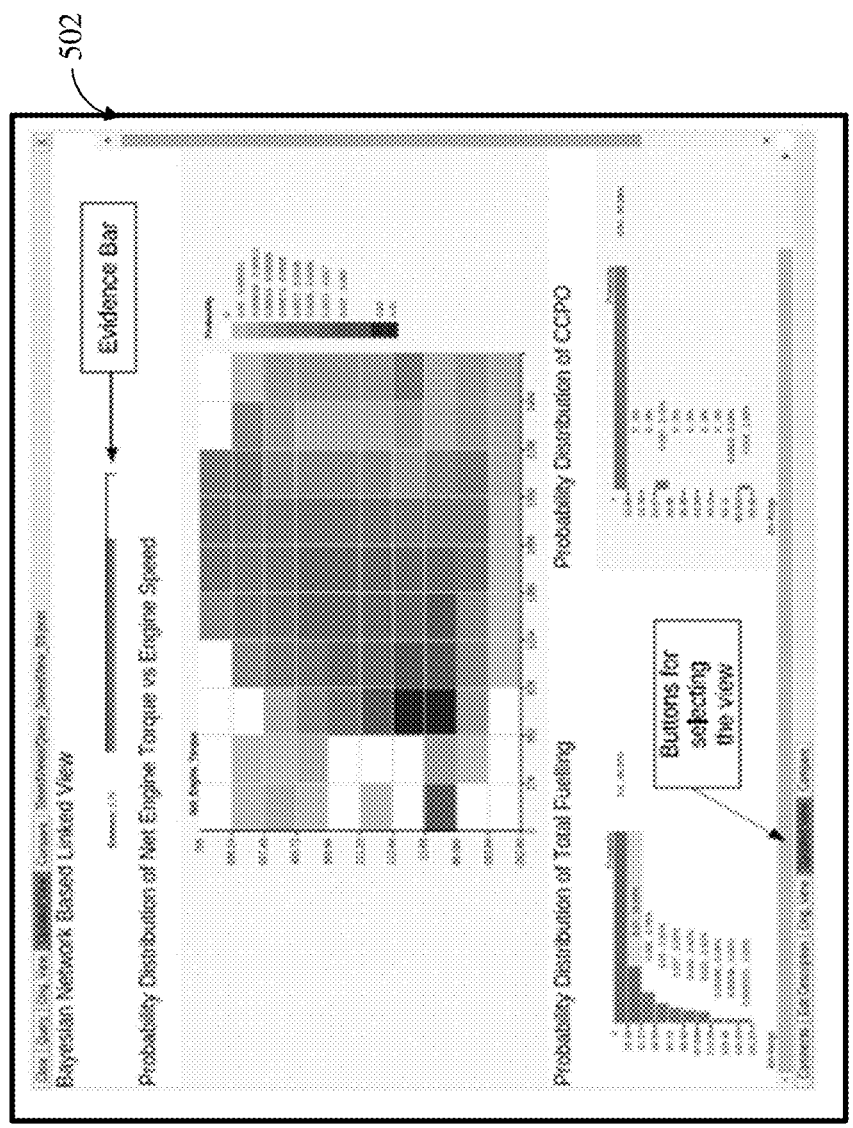
Figure 5C:
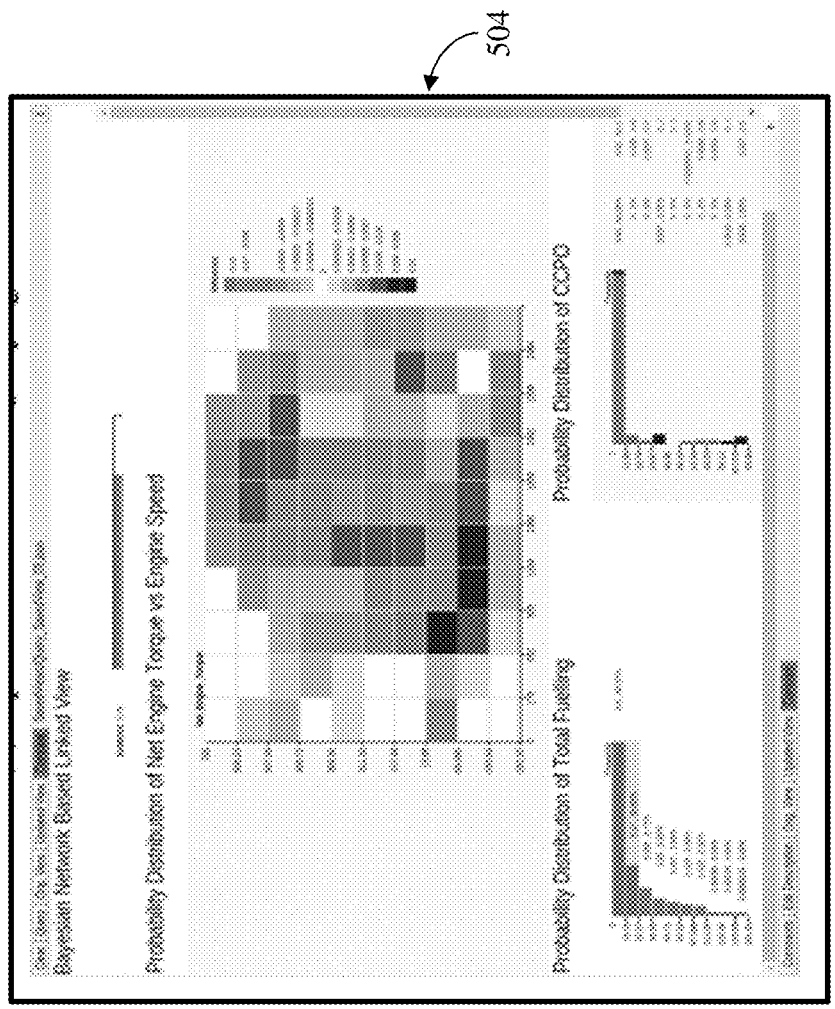

FIGS. 5A, 5B and 5C illustrate an example embodiment of a visual analytics technique for exploring correlations across sensors in accordance with an example embodiment. Multiple groups of sensors in an engine, measure components that affect each other during operation. The machines during their operations transition from one state to another, for example from laden to un-laden, or from moving to stationary state. Such states are characterized by a range of values of select sensors. Users often need to analyze the distribution of other related sensors in a given state. For example, study of distribution of engine oil temperature when the engine is laden. Similarly, in some instances the users may require to analyze the distribution of engine speed and net engine torque, when fuel consumption is high.

To enable the users to execute the conditional distribution queries as described above, a single linked view containing distributions of a correlated set of sensors is presented in FIG. 5A linked view may contain 1D or 2D distributions of sensors visualized as histograms or heat maps. Users may select specific range of values of specific sensors, and press a query button to see the resultant conditional distribution or remaining sensors. At least a single pass through all the data is required for executing such queries directly. Techniques already known in the art are utilized to summarize the data in a Bayesian network for more efficient query execution. In this example embodiment 'business data fusion technique' is utilized to summarize the data in a Bayesian network for more efficient query execution.

The dependency between sensor distributions is modeled using Bayesian Network by using methods available in the art. The Bayesian network is created using domain-knowledge provided by users. Condition on range of values of sensors is input by the users, Bayesian inference is run on the data to arrive at the conditional probability distribution of dependent sensors, this is displayed to the users. As a result, conditional distribution is generated without accessing the sensor data again. The result, is computed at interactive rates, independent of the raw data volume.

A linked view for visualization is utilized to analyze the data for multiple related sensors. A user may define ranges for multiple sensors in a query by selecting the appropriate bins or cells in their respective charts. The query is executed by pressing the query button in the linked view window and on completion, the charts get updated with the results. To facilitate analysis of the results of a query, three modes for a linked view are provided. A user may easily switch between these modes by clicking appropriate button. The 'Before' mode shows the original data and query range submitted. The 'After' mode shows the results of the query.

The third view is the 'Comparison' mode which explicitly plots changes in the distributions. Stacked histograms are used with blue bars to show the original probabilities and red bars to show the estimated. Changes in the heat-map counts may also occur if a conditional query is performed on the one dimensional distributions. These are plotted as a heat-map of differences. A cold to warm color scale is utilized for this heat-map. Cells for which the probabilities increase (or differences are negative) are colored in shades of blue, those for which the probabilities decrease (or differences are positive) are plotted in shades of red and cells with no change in values are plotted as white.

In an example embodiment, the FIGS. 5A, 5B and 5C illustrate a Bayesian network linking engine speed, torque, fuel consumption and a fourth proprietary parameter. This is visualized as a linked view with a speed-torque heat-map and histograms for fuel consumption and the fourth parameter, as shown in FIG. 4. Further, FIG. 5A illustrates an initial view 500 with query range. In the given embodiment a query for a low range for total fueling is input by the user. The charts 502 updated with the results of the query are illustrated in FIG. 5B. In the given embodiment, when fueling is low, the speed and torque cannot be high and this is inferred by an increase in darker blue and red cells in the left half of the x-axis of the heat-map in FIG. 5B. This is further validated by the comparison view 504 illustrated by FIG. 5C. In FIG. 5C more number of red cells on the right side of the x-y plane indicating decrease in probabilities of occurrence of high speed and torque values is displayed. The fourth parameter shows a small change in its distribution.

Figure 6:
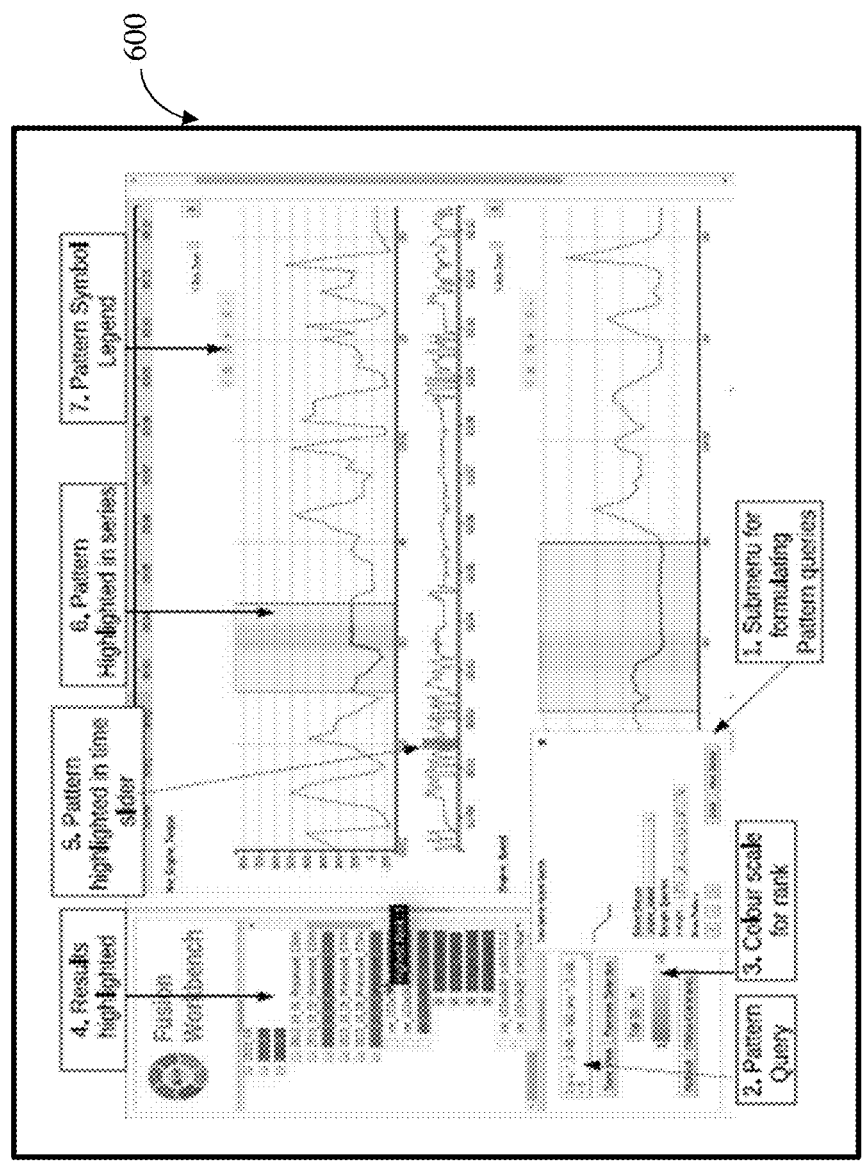
FIG. 6 illustrates an example representation of a visual analytics technique for waveform queries on time-series, according to some embodiments of the present disclosure.

FIG. 6 illustrates an example representation 600 of a visual analytics technique for waveform queries on time-series, in accordance with an embodiment. It is sometimes required by the users to analyze the performance of a machine under particular conditions, such as in a laden condition (i.e., under load), for example, when a truck is going up-hill or a fork-lift is lifting a heavy load or a vehicle making a hard stop. Users while debugging a failure, may want to search for particular multi-sensor waveform pattern in the data to observe the frequency, duration and time period of occurrence of the said multi-sensor waveform pattern.

In order to detect a particular multi-sensor waveform pattern, a temporal pattern has to be formulated using domain knowledge. For example, when an engine is laden, the torque being delivered increases but its speed decreases (unlike while, accelerating to cruising speed). So, the laden engine condition can be detected by determining those intervals of time in which torque increases but speed decreases.

In a given embodiment time-series data is pre-processed to make it searchable via queries specified as patterns of increasing, decreasing or flat slopes with bounds on the duration of occurrence. A pattern recognition algorithm known in the art is utilized to combine a slope-based logical run-length encoding, clustering of symbolic patterns in this space, and a trie-based index structure for efficiently retrieving instances of multi-sensor logical patterns.

Time-series for multiple sensors are organized in files corresponding to sessions of operation, this range from 30 min to a few hours each. A user can view the series of one or more sensors in one window and browse them using individual time sliders or a global time slider which manipulates all the displayed series' together.

Waveform queries are input to the system using a query language that uses the symbols 'o' for flat, '+' for increase and '−' for decrease, to specify slope patterns. A user can specify time-duration for each symbol as well as bounds on the sensor value for each symbol. So the query ':o+o:*,5, *:>20,5-10,≥20' translates to sensor 1 being steady with value greater than 20, for any length of time, then increasing for 5 seconds by 5-10 units and then steady again for any length of time with value greater than 20. A visual interface is provided to aid in the input waveform queries. Buttons are provided for the three symbols as well as for commonly occurring 3-symbol patterns. The queries with default values for duration and sensor value automatically appear in the text box for the user to edit.

The results of the query are displayed as follows. The user may select the number of results to be shown from multiple options such as 'Top 10', 'Top 20' or all using a drop down menu that appears when the query is completed and some results have been. The files containing the pattern are highlighted in the file tree view using varying shades of blue which indicate the rank assigned to them by our pattern search algorithm. If a pattern occurs multiple times in one file, the color corresponding to the highest occurring rank is displayed. The user may select a file to view the pattern discovered.

A color is assigned to each symbol and the portion of the time series where the pattern occurs is highlighted with the appropriate colors. The entire pattern is bounded by a thin box in the color of its rank. Further, all occurrences of the pattern in the individual time sliders for each time series are indicated so that the user can easily navigate to them after zooming into a pattern.

A user inputs the query that searches for occurrences of the waveform pattern 'o+o' (o: flat, +: increase) on torque and 'o−o' (−:decrease) on speed, as shown in FIG. 6. All occurrences of the patterns are found and returned with ranks assigned to the results. The files containing the pattern are highlighted in FIG. 5 (illustrated as Results highlighted 4), in colors mapped to the rank scale 3. Darker colors indicate higher rank. A user may then open the individual time series for each sensor and each occurrence of the pattern in the time series is highlighted as shown in FIG. 6 pattern highlighted in series 6. A user may open additional sensor time series' and view them in temporal sync with detected patterns to determine the duration of occurrence of a particular waveform.

Figure 7:
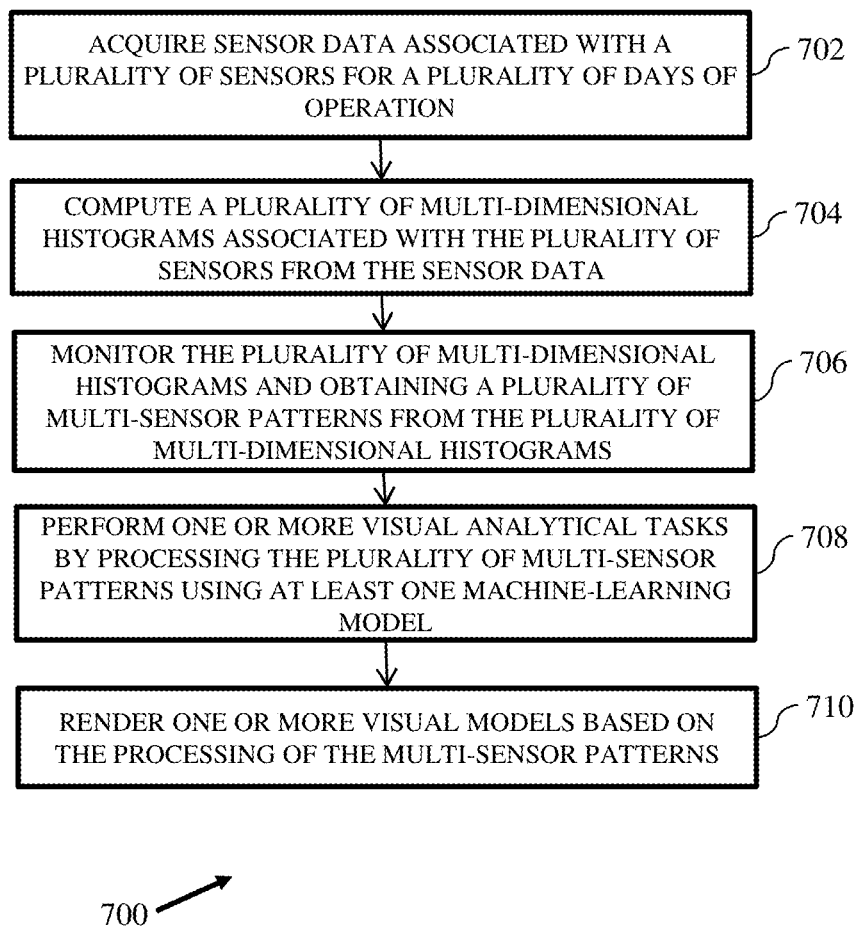
FIG. 7 illustrates a flow diagram of a method for multi-sensor visual analytics, according to some embodiments of the present disclosure.

FIG. 7 illustrates a flow diagram of a method 700 for multi-sensor visual analytics, in accordance with the present disclosure. The method 700 may be described in the general context of computer executable instructions. Generally, computer executable instructions can include routines, programs, objects, components, data structures, procedures, modules, functions, etc., that perform particular functions or implement particular abstract data types. The method 700 may also be practiced in a distributed computing environment where functions are performed by remote processing devices that are linked through a communication network. The order in which the method 700 is described is not intended to be construed as a limitation, and any number of the described method blocks can be combined in any order to implement the method 700, or an alternative method. Furthermore, the method 700 can be implemented in any suitable hardware, software, firmware, or combination thereof. In an embodiment, the method 700 depicted in the flow chart may be executed by a system, for example, the system 200 of FIG. 2. In an example embodiment, the system 200 may be embodied in a computing device, for example, the computing device 110 (FIG. 1).

At 702, the method 700 includes acquiring sensor data associated with a plurality of sensors for a plurality of days of operation. At 704, the method 700 includes computing a plurality of histograms associated with the plurality of sensors from the sensor data. The plurality of histograms includes operational profiles of the plurality of sensors. At 706, the method 700 includes monitoring the plurality of histograms and obtaining a plurality of multi-sensor patterns from the plurality of histograms. The plurality of multi-sensor patterns are indicative of one or more properties of a plurality of sensor-clusters of the plurality of sensors. At 708, the method 700 includes performing one or more visual analytical tasks by processing the plurality of multi-sensor patterns using at least one machine-learning model. At 710, the method 700 includes rendering one or more visual models based on the processing of the multi-sensor patterns.

Various embodiments of the disclosed method and system provides a multi-sensor visual analytics on large-scale sensor data that utilizes machine-learning models to ease navigation and provide additional insight. The embodiments are explained based on four real-life scenarios involving visual analytics, viz. a) study the operational profiles of sensors by exploring the distributions of each sensor's values on days of operation, (b) identify days of operation having similar behavioural profiles (c) understand how dependent sensors affect each other, and (d) identify occurrences of events, characterized by specific patterns in sensor readings. The embodiments illustrate that visual analytics experience can be enhanced in the above scenarios using four types of machine-learning models, viz., histogram clustering, multi-subspace summarization of histograms, probabilistic queries using Bayesian network models, and logical temporal indexing. These machine-learning models are used to augment and aid visual analytics tasks to interlink thousands of visualizations, make them easily navigable, and efficiently query-able.

The disclosed method and system identifies subspaces of dimensions that are similar to cluster the histograms by using clustering and summarization approaches to identify similar histograms. Moreover, the system is caused to interlink the sensor data observed from individual days of operations, and then render the visualizations based on the interlined sensor data. In addition, the disclosed method enables searchability and visualization of voluminous multi-sensor time-series patterns.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for multi-sensor visual analytics, comprising:
    acquiring sensor data associated with a plurality of sensors for a plurality of days of operation, via one or more hardware processors;
    computing a plurality of multi-dimensional histograms associated with the plurality of sensors from the sensor data, via the one or more hardware processors, the plurality of multi-dimensional histograms comprising operational profiles of the plurality of sensors, and wherein the plurality of multi-dimensional histograms comprising one of two dimensional and three dimensional histograms;
    monitoring the plurality of multi-dimensional histograms and obtaining a plurality of multi-sensor patterns from the plurality of multi-dimensional histograms, via the one or more hardware processors, the plurality of multi-sensor patterns indicative of one or more properties of a plurality of sensor-clusters of the plurality of sensors;
    performing one or more visual analytical tasks by processing the plurality of multi-sensor patterns using at least one machine-learning model, via the one or more hardware processors; and
    rendering one or more visual models based on the processing of the multi-sensor patterns, via the one or more hardware processors.

2. The method of claim 1, wherein processing the plurality of multi-sensor patterns using at least one machine-learning model comprises obtaining operational profiles of the plurality of sensors based on a clustering of the multi-sensor patterns to summarize common multi-sensor patterns of the operational profiles.

3. The method of claim 2, wherein the clustering is performed based on a Balanced Iterative Reducing and Clustering using Hierarchies (BIRCH) clustering model.

4. The method of claim 3, wherein rendering the one or more visual models comprises presenting a visualization of operational profiles organized hierarchically.

5. The method of claim 1, wherein processing the plurality of multi-sensor patterns comprises identifying a set of days of operation from amongst the plurality of days of operation, the set of days of operation for the plurality of sensors associated with matching histograms.

6. The method of claim 5, wherein the at least one machine-learning model comprises a BIRCH model.

7. The method of claim 1, wherein processing the plurality of multi-sensor patterns comprises identifying distribution of sensor values derived from the sensor data under a condition, and wherein identifying distribution of sensor values under the condition is performed by enabling probabilistic queries using a Bayesian data fusion technique on the plurality of multi-dimensional histograms.

8. The method of claim 1, wherein processing the plurality of multi-sensor patterns comprises: logically indexing a plurality of multi-sensor time-series patterns derived from the sensor data, and wherein the plurality of the multi-sensor time-series patterns corresponds to sessions of operation of the plurality of sensors, wherein logically indexing the plurality of multi-sensor time-series patterns enables querying the plurality of the multi-sensor time-series patterns.

9. The method of claim 8, wherein rendering the one or more visual models comprises rendering, based on the querying, one or more multi-sensor time-series patterns from amongst the plurality of multi-sensor time-series patterns.

10. A system for summarizing multi-sensor data, the system comprising:
    at least one memory; and
    at least one processor, the at least one memory coupled to the at least one processor wherein the at least one processor is capable of executing programmed instructions stored in the at least one memory to:
        acquire sensor data associated with a plurality of sensors for a plurality of days of operation;
        compute a plurality of multi-dimensional histograms associated with the plurality of sensors from the sensor data, via the one or more hardware processors, the plurality of multi-dimensional histograms comprising operational profiles of the plurality of sensors, and wherein the plurality of multi-dimensional histograms comprising one of two dimensional and three dimensional histograms;

monitor the plurality of multi-dimensional histograms and obtaining a plurality of multi-sensor patterns from the plurality of multi-dimensional histograms, via the one or more hardware processors, the plurality of multi-sensor patterns indicative of one or more properties of a plurality of sensor-clusters of the plurality of sensor;

perform one or more visual analytical tasks by processing the plurality of multi-sensor patterns using at least one machine-learning model; and render one or more visual models based on the processing of the multi-sensor patterns.

11. The system of claim 10, wherein to process the plurality of multi-sensor patterns using at least one machine-learning model, wherein the one or more hardware processors are further configured by the instructions to obtain operational profiles of the plurality of sensors based on a clustering of the multi-sensor patterns to summarize common multi-sensor patterns of the operational profiles.

12. The system of claim 11, wherein the one or more hardware processors are further configured by the instructions to perform clustering based on a Balanced Iterative Reducing and Clustering using Hierarchies (BIRCH) clustering model.

13. The system of claim 12, wherein to render the one or more visual models, the one or more hardware processors are further configured by the instructions to present a systematic visualization of operational profiles organized hierarchically.

14. The system of claim 10, wherein to process the plurality of multi-sensor patterns, the one or more hardware processors are further configured by the instructions to identify a set of days of operation from amongst the plurality of days of operation, the set of days of operation for the plurality of sensors associated with matching histograms.

15. The system of claim 14, wherein the at least one machine-learning model comprises a BIRCH model.

16. The system of claim 10, wherein to process the plurality of multi-sensor patterns, the one or more hardware processors are further configured by the instructions to identifying distribution of sensor values derived from the sensor data under a condition, and wherein identifying distribution of sensor values under the condition is performed by enabling probabilistic queries using a Bayesian data fusion technique on the plurality of multi-dimensional histograms.

17. The system of claim 10, wherein to process the plurality of multi-sensor patterns, the one or more hardware processors are further configured by the instructions to logically index a plurality of multi-sensor time-series patterns derived from the sensor data, and wherein the plurality of the multi-sensor time-series patterns corresponds to sessions of operation of the plurality of sensors, wherein logically indexing the plurality of multi-sensor time-series patterns enables querying the plurality of the multi-sensor time-series patterns.

18. The system of claim 17, wherein to render one or more visual models, the one or more hardware processors are further configured by the instructions to render the one or more visual models comprises rendering, based on the querying, one or more multi-sensor time-series patterns from amongst the plurality of multi-sensor time-series patterns.

19. A non-transitory computer-readable medium having embodied thereon a computer program for executing a method for multi-sensor visual analytics, the method comprising:

acquiring sensor data associated with a plurality of sensors for a plurality of days of operation;

computing a plurality of multi-dimensional histograms associated with the plurality of sensors from the sensor data, the plurality of multi-dimensional histograms comprising operational profiles of the plurality of sensors, and wherein the plurality of multi-dimensional histograms comprising one of two dimensional and three dimensional histograms;

monitoring the plurality of multi-dimensional histograms and obtaining a plurality of multi-sensor patterns from the plurality of multi-dimensional histograms, the plurality of multi-sensor patterns indicative of one or more properties of a plurality of sensor-clusters of the plurality of sensors;

performing one or more visual analytical tasks by processing the plurality of multi-sensor patterns using at least one machine-learning model; and rendering one or more visual models based on the processing of the multi-sensor patterns.

* * * * *